Dec. 30, 1958  W. E. REYNOLDS ET AL  2,866,388
AMMUNITION BELT CONNECTOR AND DISINTEGRATOR
Filed Sept. 11, 1956  2 Sheets-Sheet 2
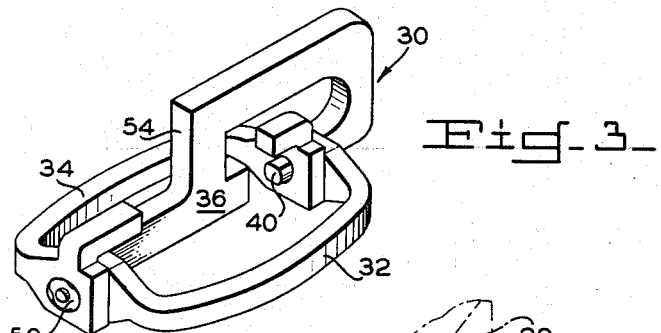
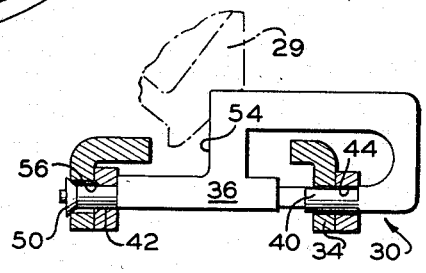
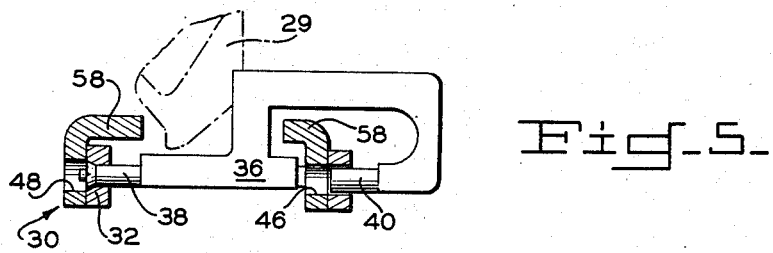
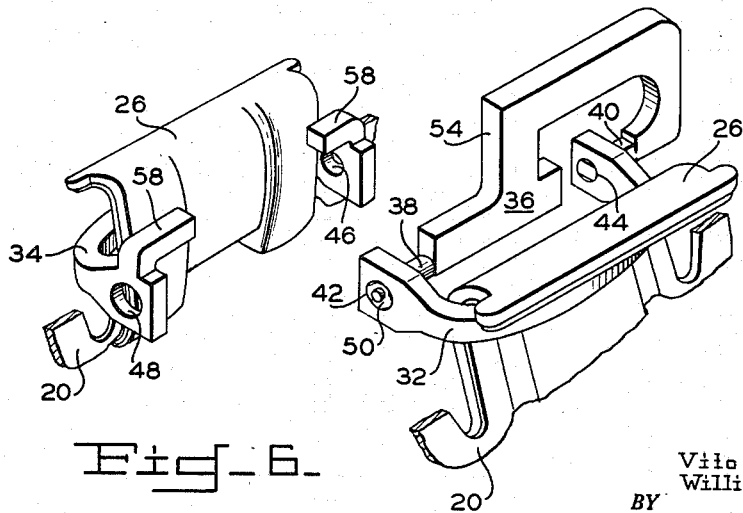
INVENTOR.
Vito A. Fusco
William E. Reynolds
BY
W. E. Thibodeau & A. W. Derr
Attorneys.

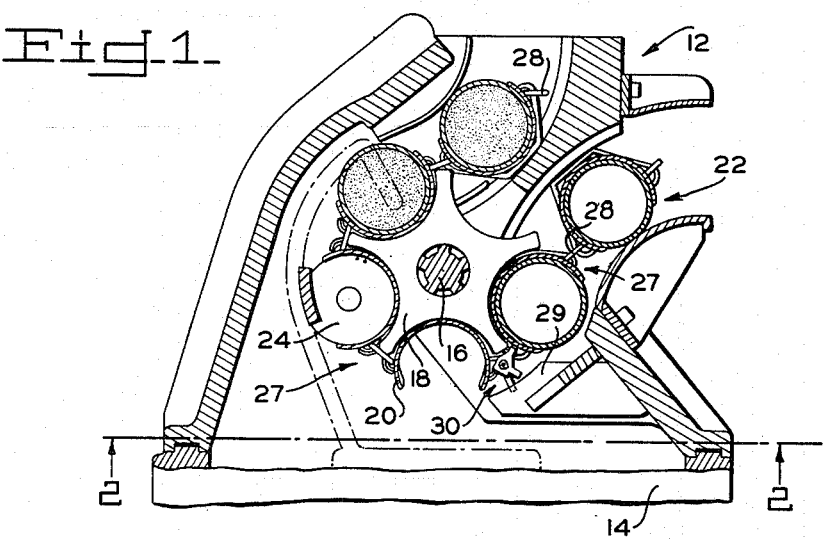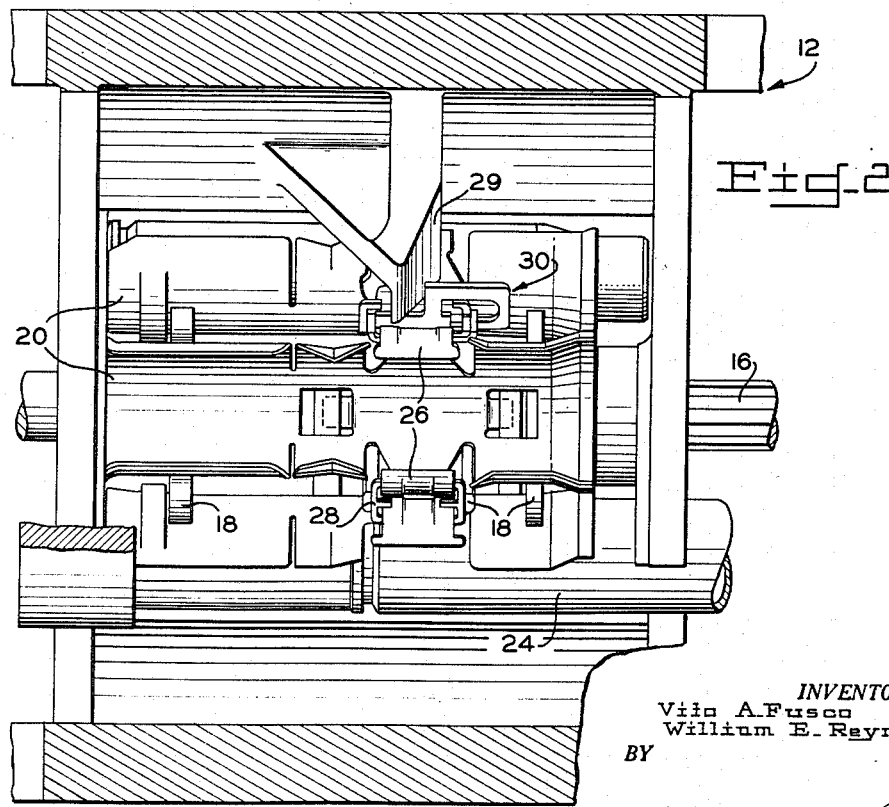

United States Patent Office 2,866,388
Patented Dec. 30, 1958

2,866,388

AMMUNITION BELT CONNECTOR AND DISINTEGRATOR

William E. Reynolds, Riverside, and Vito A. Fusco, Chicago, Ill., assignors, by mesne assignments, to the United States of America as represented by the Secretary of the Army Application September 11, 1956, Serial No. 609,332

3 Claims. (Cl. 89—35)

Our invention relates to guns for relinking the cases of discharged cartridges in an ammunition belt and more particularly to a device for such relinking disposed for segmental disintegration of the ammunition belt after the relinking.

An entire ammunition belt inclosing discharged cartridge cases is difficult to dispose of in close quarters such as are encountered in aircraft or tank application, therefore, it is an object of our invention to provide a device for connecting a predetermined number of the links of the ammunition belt in segments and for disconnecting the segments from the belt subsequent to the relinking.

Another object of our invention is to provide such a device with disintegrating connectors and a feeder cam for operation thereof.

A further object of our invention is to provide each of such connectors with a pair of members with one of the members including a latch for releasable engagement with the other of the members.

Other aims and objects of our invention will appear from the following description.

In carrying out our invention, an ammunition belt for a gun is provided with cartridge engaged links, couplings for securing the links of the belt in segments of a predetermined number of links, disintegrating connectors for securing the segments together to form the belt, and a cam disposed in the feeder for engagement with the disintegrating connectors to separate the belt into the segments after the cases of the fired cartridges have been relinked thereto.

For a more complete understanding, reference is directed to the following description and accompanying drawings in which:

Fig. 1 is a transverse section of the feeder of a revolver-type automatic gun with an ammunition belt therein incorporating an embodiment of our invention;

Fig. 2 is an enlarged view along line 2—2 of Fig. 1;

Fig. 3 is an enlarged perspective view of the connector of our invention;

Fig. 4 is an elevational view partially in cross-section of the connector of Fig. 3 with the latch in normal position;

Fig. 5 is a view similar to Fig. 4 with the latch displaced for separation of the members; and Fig. 6 is an enlarged view of the members separated and secured to adjacent links.

Accordingly, feeder 12 of a gun 14 includes a shaft 16 with sprockets 18 thereon for engagement with the links 20 of an ammunition belt 22 and cartridges 24 disposed in the links. Shaft 16 is rotatably responsive to discharge of gun 14 for conveying links 20 to a station wherein the cartridges are rammed from the engaging links into the firing chamber of the gun (not shown), and for conveyance of the links to an extraction station for reinclosure therein of the cases of the cartridges subsequent to the discharge thereof.

Links 20 include pairs of ears 26 and belt segments 27 each include a predetermined number of links which are joined by couplings 28 in respective engagement with the contiguous ears of adjacent pairs of links. The segments are connected in the ammunition belt by a disintegrating connector 30, and a cam 29 is disposed in feeder 12.

Disintegrating connector 30 includes a pair of U-shaped members 32 and 34 for engagement with contiguous ears 26 of the leading and end ones of the links 20 of adjacent segments 27. A latch 36 is provided with pins 38 and 40 slidably received in a unidirection respectively by holes 42 and 44 in the ends of member 32 and an over-size hole 48 and a hole 46 in the ends of member 34 to pivotally join such members. Pin 38 is upset at portion 50 to a greater diameter than hole 48 to secure member 34 to member 32.

Cam 29 is disposed for engagement with a shoulder 54 of latch 36 for displacement thereof to bend upset portion 50 inwardly and force pin 38 from hole 48, as shown in Fig. 4, to release member 34. Upset portion 50 is disposed for engagement with a countersink 56 in member 32 for retention of latch 36 therein, and lugs 58 are provided to retain member 34 in engagement with the corresponding ear 26 after separation of members 32 and 34.

Thus, when sprockets 18 are rotated, ammunition belt 22 with cartridges 24 releasably engaged thereto by the component links 20 is moved into gun 14 to the ramming station wherein the cartridges are successively moved from the belt by a conventional ramming device (not a part of this invention) to the firing chamber of the gun (not shown). The emptied links 20 continue to be carried by sprockets 18 to the extraction station where the fired cases extracted from the firing chamber are relinked to belt 22. After leaving the extraction station, links 20 pass by cam 29 which, when one of the disintegrating connectors 30 is adjacent thereto, engages shoulder 54 of the respective latch 36 to cammingly force pin 38 thereof through the enlarged hole 48 in member 34, collapsing upset portion 50 sufficiently for passage through such hole. The collapsed upset portion 50 is received by countersink 56 to release member 34 from member 32 and thereby disconnect the segment 27 which has passed cam 29 from the remainder of belt 22. Latch 36 remains connected to member 32 by the engagement of upset portion 50 with countersink 56, which retains pins 38 and 40, respectively, in holes 42 and 44 of such member.

Although a particular embodiment of the invention has been described in detail herein, it is evident that many variations may be devised within the spirit and scope thereof and the following claims are intended to include such variations.

We claim:

1. In combination with a gun having a ramming and an extraction station and provided with a feeding mechanism having a rotatable sprocket, an ammunition belt engaged by the sprocket for conveying cartridges to the ramming station and fired cases from the extraction station, said belt including a plurality of links for releasably gripping the cases of the cartridges, a pair of ear portions extending oppositely from each of said links, couplings engageable with contiguous ones of said ears on adjacent ones of a predetermined number of said links to form a segment of said belt, a disintegrating connector for releasably connecting a plurality of said segments to form said belt, said disintegrating connector being comprised of a pair of U-shaped members respectively engaged with the ones of said ears extending from opposite ends of a pair of said segments, said pair of U-shaped members being provided with holes in the ends thereof and disposed to coaxially align said holes in one of said members with corresponding ones of said holes in the other one of said members, and a latch provided with a pair of pins respectively engageable with corresponding ones of said holes in each of said members for pivotally joining said members, an upset portion on the end of one of said pins for retaining said pins in engagement with said holes, a shoulder portion on said latch, and a cam disposed in the feeding mechanism for engagement by said shoulder when moved past the extraction station to move said latch for collapsing said upset portion and moving said pins out of engagement with the ones of said holes in one of said members for disengaging said members and disconnecting the forward one of said segments from said belt.

2. The combination of claim 1 and including lugs on the one of said members engaged with the end one of said links on the disconnected one of said segments for inclosing said ears on said end link to retain said one of said members thereon.

3. The combination of claim 1 wherein the one of said holes adjacent said upset portion is of enlarged diameter to pass the collapsed upset portion therethrough, and the one of said holes adjacent said hole of enlarged diameter is countersunk to receive said upset portion for disconnection of said members and for retaining said latch to the one of said members engaged thereby.

References Cited in the file of this patent

FOREIGN PATENTS 123,848    Sweden  ---------------- Jan. 18, 1949